(12) United States Patent
Wicker

(10) Patent No.: US 11,418,642 B1
(45) Date of Patent: Aug. 16, 2022

(54) METHODS, SYSTEMS AND COMPUTER PROGRAM PRODUCTS FOR DETERMINING ROOT CAUSES OF DETECTED ANOMALIES IN A TELECOMMUNICATIONS NETWORK

(71) Applicant: Bandwidth Inc., Raleigh, NC (US)

(72) Inventor: Ethan Wicker, Denver, CO (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/709,562

(22) Filed: Mar. 31, 2022

(51) Int. Cl.
*H04M 3/08* (2006.01)
*H04M 15/00* (2006.01)

(52) U.S. Cl.
CPC ............. *H04M 3/08* (2013.01); *H04M 15/41* (2013.01)

(58) Field of Classification Search
CPC ......... H94M 3/08; H04M 15/41; H04L 45/74; G06Q 20/403; G10L 15/063
USPC ....................................................... 379/9.04
See application file for complete search history.

(56) References Cited

U.S. PATENT DOCUMENTS

| | | | |
|---|---|---|---|
| 6,038,555 A * | 3/2000 | Field .................... | G06Q 20/403 706/15 |
| 2007/0041538 A1* | 2/2007 | Paden ................. | H04M 3/2263 379/114.1 |
| 2009/0207835 A1* | 8/2009 | Lott ........................ | H04L 45/74 370/352 |

* cited by examiner

*Primary Examiner* — Md S Elahee
(74) *Attorney, Agent, or Firm* — Gregory Stephens

(57) ABSTRACT

Methods for determining a cause of a detected anomalous event in a telecommunications system are provided. The methods include detecting an anomalous event in the telecommunications system and retrieving relevant call detail record (CDR) data associated with the detected anomalous event for at least one identified time interval responsive to detecting the anomalous event. The relevant CDR data includes both current CDR data for the at least one identified time interval and historical CDR data for past intervals corresponding to the at least one identified time interval. The relevant CDR data including the current CDR data and the historical CDR data is preprocessed and the preprocessed relevant CDR data is processed to determine a root cause of the detected anomalous event. Processing the preprocessed relevant CDR data includes comparing the current CDR data and the historical CDR data to determine the root cause of the detected anomalous event.

24 Claims, 12 Drawing Sheets

CDR 251

| |
|---|
| CALL_DIRECTION |
| CALL_TYPE |
| CARRIER NAME |
| CUSTOMER_SBC_INVITE_TIME |
| CUSTOMER_SBC_CALL_DURATION_IN_MS |
| CUSTOMER_SBC_DEVICE_NAME |
| CUSTOMER_SBC_DISCONNECT_TIME |
| CUSTOMER_SBC_DISCONNECTING_PARTY |
| CALLING_TELEPHONE NUMBER |
| CALLING_NUMBER_LATA |
| CALLED_TELEPHONE NUMBER |
| CALLED_NUMBER_COUNTRY |
| SIP_RESPONSE_CODE |

FIG. 2

| historical_or_current sip_response_code | current | historical |
|---|---|---|
| 200 | 1249.0 | 4923.0 |
| 404 | 107.0 | 73.0 |
| 486 | 23.0 | 90.0 |
| 487 | 65.0 | 199.0 |
| 503 | 5.0 | 27.0 |

FIG. 8

| historical_or_current customer_sbc_device_name | current | historical |
|---|---|---|
| Customer SBC 1 | 78 | 323 |
| Customer SBC 10 | 21 | 101 |
| Customer SBC 11 | 113 | 390 |
| Customer SBC 12 | 120 | 405 |
| Customer SBC 13 | 120 | 399 |
| Customer SBC 14 | 28 | 91 |
| Customer SBC 15 | 24 | 105 |
| Customer SBC 16 | 30 | 83 |
| Customer SBC 2 | 108 | 442 |
| Customer SBC 3 | 126 | 453 |
| Customer SBC 4 | 93 | 334 |
| Customer SBC 5 | 126 | 440 |
| Customer SBC 6 | 115 | 432 |
| Customer SBC 7 | 109 | 411 |
| Customer SBC 8 | 121 | 433 |
| Customer SBC 9 | 117 | 474 |

FIG. 9

| historical_or_current customer_sbc_device_name | current_standardized_residuals | historical_standardized_residuals |
|---|---|---|
| Customer SBC 1 | -0.990240 | 0.990240 |
| Customer SBC 10 | -1.142713 | 1.142713 |
| Customer SBC 11 | 0.594418 | -0.594418 |
| Customer SBC 12 | 0.836264 | -0.836264 |
| Customer SBC 13 | 0.983781 | -0.983781 |
| Customer SBC 14 | 0.566137 | -0.566137 |
| Customer SBC 15 | -0.786693 | 0.786693 |
| Customer SBC 16 | 1.340362 | -1.340362 |
| Customer SBC 2 | -1.063201 | 1.063201 |
| Customer SBC 3 | 0.210128 | -0.210128 |
| Customer SBC 4 | 0.187745 | -0.187745 |
| Customer SBC 5 | 0.510327 | -0.510327 |
| Customer SBC 6 | -0.235057 | 0.235057 |
| Customer SBC 7 | -0.264686 | 0.264686 |
| Customer SBC 8 | 0.252726 | -0.252726 |
| Customer SBC 9 | -1.006160 | 1.006160 |

FIG. 10

| historical_or_current sip_response_code | current_standardized_residuals | historical_standardized_residuals |
|---|---:|---:|
| 200 | -7.752557 | 7.752557 |
| 404 | 12.597148 | -12.597148 |
| 486 | -0.281558 | 0.281558 |
| 487 | 1.288301 | -1.288301 |
| 503 | -0.802390 | 0.802390 |

FIG. 11

METHODS, SYSTEMS AND COMPUTER PROGRAM PRODUCTS FOR DETERMINING ROOT CAUSES OF DETECTED ANOMALIES IN A TELECOMMUNICATIONS NETWORK

FIELD

The present inventive concept generally relates to telecommunications networks and, more particularly, to determining root causes of anomalous events.

BACKGROUND

Telecommunication carriers generally have contracts with customers that guarantee a specific level of service, i.e. Quality of Service (QoS). When the quality of service falls below a particular threshold, customers may look for new carriers that can provide the quality of service they require. Telecommunications networks are complex, and performance of the network may be affected by any number of activities in the network. For example, some telecommunication carriers provide features to reduce cost, but these features may inadvertently interfere with the level of service provided. In other words, "anomalies" may occur in the network that cause unforeseen problems.

SUMMARY

Some embodiments of the present inventive concept provide methods for determining a cause of a detected anomalous event in a telecommunications system. The methods include detecting an anomalous event in the telecommunications system and retrieving relevant call detail record (CDR) data associated with the detected anomalous event for at least one identified time interval responsive to detecting the anomalous event. The relevant CDR data includes both current CDR data for the at least one identified time interval and historical CDR data for past intervals corresponding to the at least one identified time interval. The relevant CDR data including the current CDR data and the historical CDR data is preprocessed and the preprocessed relevant CDR data is processed to determine a root cause of the detected anomalous event. Processing the preprocessed relevant CDR data includes comparing the current CDR data and the historical CDR data to determine the root cause of the detected anomalous event.

Related systems and computers are also provided.

BRIEF DESCRIPTION OF THE DRAWINGS

FIG. 2 is a block diagram illustrating fields in an example call detail record (CDR) in accordance with some embodiments of the present inventive concept.

FIG. 8 illustrates fields of the CDR including current and historical data associated with the sip_response_code in accordance with some embodiments of the present inventive concept.

FIGS. 9 through 11 illustrates fields of the CDR including current and historical data associated with the count of each the sip_response_code in accordance with some embodiments of the present inventive concept.

DETAILED DESCRIPTION OF EMBODIMENTS

Figure 1:
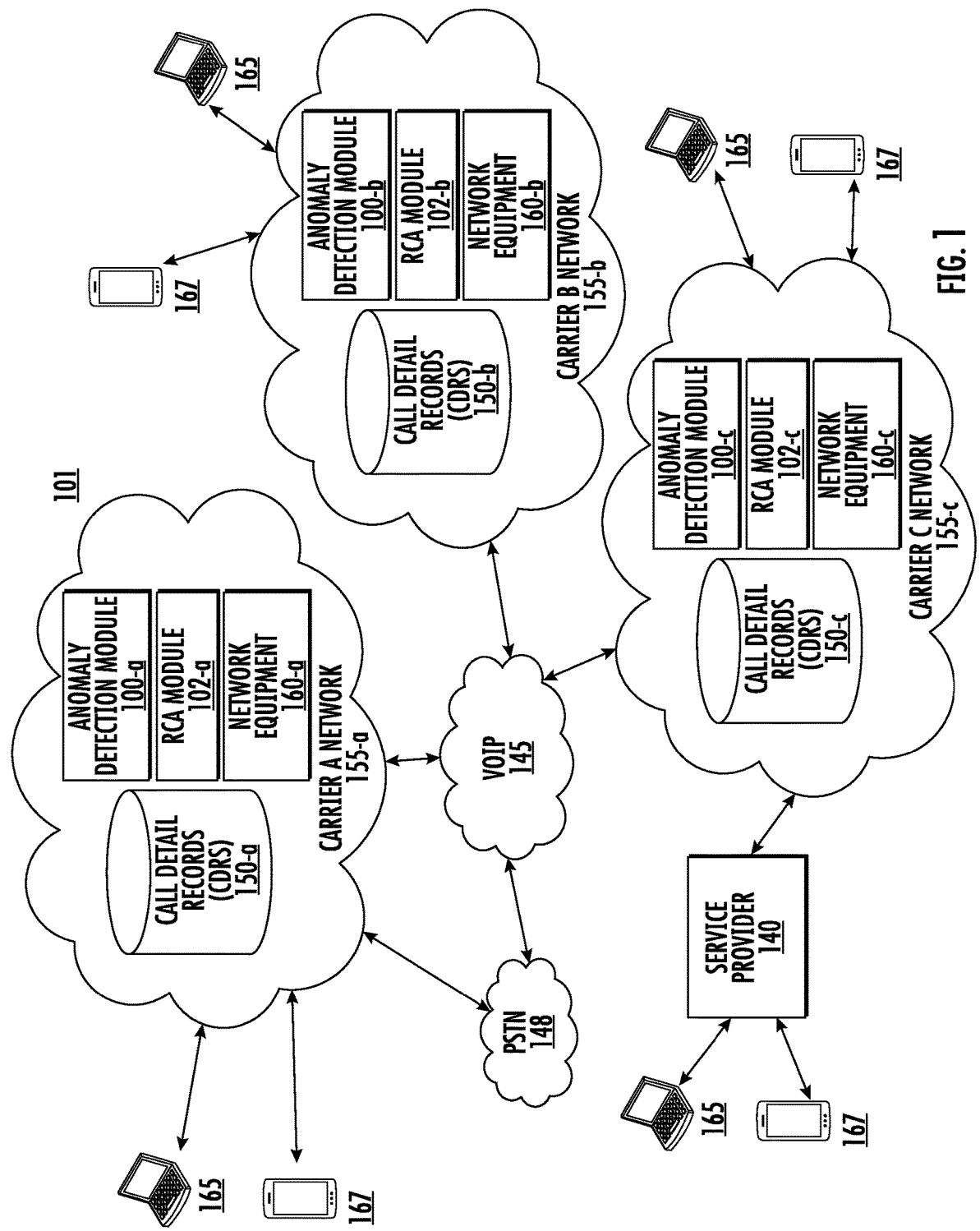
FIG. 1 is a block diagram illustrating a network including an anomaly detection module and a root cause analysis (RCA) module in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, inadvertent anomalies that occur in a telecommunications network may affect call services. When telecommunication carriers do not sustain a guaranteed level of service, customers may look for other carriers. Thus, some embodiments of the present inventive concept are directed to determining a root cause associated with detected anomalies in the telecommunications network that may cause unforeseen decreases in a quality of service provided to a customer. In particular, some embodiments of the present inventive concept are directed to anomalies located by analyzing details associated with calls made in the telecommunications network (call data) as will be discussed further herein.

As used herein, "anomaly" refers to a deviation from what is standard, normal, or expected. There are different types of anomalies in the context of the present inventive concept. For example, "threshold anomalies" and "contextual anomalies." As used herein, a "threshold anomaly" refers to an anomaly that is defined solely based on a value crossing over some chosen threshold. For example, if for a given time interval (e.g. hour of time), an average length of calls (ALOC) for a particular Customer A drops below 20 minutes, this hour of time (time interval) represents an anomaly. In this example, the arbitrary value of 20 minutes is chosen as the threshold beforehand. In other words, the threshold of 20 minutes is predefined. A "contextual anomaly," on the other hand, refers to an anomaly that is defined partially based on "contextual" information, such as a time of day, or when compared to other data points. Thus, rather than an arbitrary threshold, the context of when the calls are made or where the calls are made from may be taken into account. Contextual anomalies may be further separated into time series based anomalies and non-time series based anomalies.

"Time series based contextual anomalies" refer to anomalies defined relative to time. For example, if the ALOC drops below 20 minutes (threshold) for Customer A at 4:00 AM, it may not be considered an anomaly if calls in the early morning tend to be shorter than calls made later in the day. However, if the ALOC drops below 20 minutes at 11:00 AM, it may be considered an anomaly as calls made during the daytime hours tend to last longer. Thus, the context of the call being made at 4:00 AM versus 11:00 AM can affect whether the situation is considered an anomaly. It will be understood that this example uses both a threshold of 20 minutes and a time component, but a time component is used to fully define a time series anomaly.

"Non-time Series based contextual anomalies" refer to anomalies that are partially defined based on contextual information other than time. For example, if 100 calls from Raleigh to Denver disconnect at exactly 3:13:07 PM, and sixty five percent of these calls appear to be redialed, this represents a potential call drop anomaly, likely due to a technical issue, such as a fiber optic cable cut or the like. This anomaly is partially defined based on time, i.e. all of the calls end at the same time, but is also defined based on a non-time based factor, i.e. the redial percentage.

It will be understood that the additional dimension of "redial percentage" helps to determine if this is an anomaly worth investigating. For example, if the redial percentage is only five percent, an assumption may be made that this was just a large conference call ending, and there may be nothing anomalous worth investigating. However, a larger redial percentage of sixty five percent indicates that the call was ended prematurely.

A specific use case of anomaly detection including determination of the root cause of the detected anomaly will now be discussed below with respect to the figures. It will be understood that although embodiments discussed herein relate to performing root cause analysis (RCA) after an anomaly has been detected and confirming that the detected anomaly is actually a true anomaly, i.e. a true positive not a false positive, embodiments of the present inventive concept are not limited to the specific data and metrics discussed herein. The methods discussed herein can be used with any call record data without departing from the scope of the present inventive concept.

As used herein, "root cause analysis (RCA)" refers to a process of determining the underlying root cause of events or problems in the network. In the telecommunications operations domains, these are sometimes highly standardized processes, and sometimes serve more as mental guidelines. A "false positive" refers to a detected anomaly that after further inspection, is not actually an anomaly. A "true positive" refers to a detected anomaly that is actually an anomaly. As will be discussed, some embodiments of the present inventive concept may confirm that the detected anomaly is a "true positive" before proceeding with determining the cause thereof.

Referring now to FIG. 1, a block diagram illustrating an example system 101 according to some embodiments of the present inventive concept will be discussed. As illustrated, the system 101 includes a voice over internet protocol (VoIP) network 145; a public switched telephone network (PSTN) 148; a plurality of carrier networks, for example, Carrier A Network 155-*a*, Carrier B Network 155-*b* and Carrier C Network 155-*c*; a service provider 140 and a plurality of endpoints 165 and 167 in communication with the Carrier Networks 155-*a*, 155-*b* and 155-*c* and the service provider 140 in accordance with some embodiments discussed herein. Although only three Carriers are illustrated in FIG. 1, it will be understood that less or more than three Carriers may be present in the system without departing from the scope of the present inventive concept.

The VoIP network 145 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The plurality of endpoints may include an internet of things (IoT) endpoint 165 and/or a telephony endpoint 167. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VoIP phone, IoT device, or another telephonic device. The endpoints 165 and 167 communicate through the networks 145 and 148 and the Carriers **155-*a*, 155-*b* and 155-*c***.

As further illustrated in FIG. 11, each Carrier network **155-*a*, 155*b* and 155-*c* may include call detail records (CDR) 150-*a*, 150-*b* and 150-*c*; network equipment 160-*a*, 160-*b* and 160-*c*; an anomaly detection module 100-*a*, 100-*b* and 100-*c* and an RCA module 102-*a*, 102-*b* and 102-*c*, respectively, in accordance with embodiments discussed herein. The network equipment 160-*a*, 160-*b* and 160-*c* may illustrate any hardware used to send, receive, and route calls at the Carrier Network 155-*a*, 155-*b* and 155-*c***.

The anomaly detection module **100-*a*, 100-*b* and 100-*c* may provide methods, systems and computer program products for detecting anomalies in the telecommunications network and informs the telecommunications Carrier 155-*a*, 155-*b* and 155-*c* of these anomalies such that the carriers may address the same. The RCA module 102-*a*, 102-*b* and 102-*c* may provide methods of determining a root cause of a detected anomaly. As used herein, the term a "telecommunications carrier" may refer to any provider of telecommunications services. FIG. 1 also includes a service provider 140. It will be understood that a carrier, such as Carrier A, B and C in FIG. 1 may be a service provider, for example, Bandwidth, Verizon, AT&T and the like. However, the reverse is not true, a service provider 140 is not necessarily a carrier. In embodiments where the service provider 140 is not a carrier, the service provider 140 may be a customer of the Carrier. FIG. 1 illustrates, the service provider 140 being a customer of Carrier C 155-*c*. It will be understood that although the service provider 140 is shown as only being a customer of Carrier C 155-*c*, embodiments of the present inventive concept are not limited thereto. The service provider 140 may be customer of other Carriers or there may be additional service providers in the system 101** without departing from the scope of the present inventive concept.

For purposes of embodiments of the present inventive concept, it is assumed that the anomaly for which the root cause is being determined has been detected. Thus, the specific details in detecting particular anomalies may not be discussed fully herein.

Referring again to FIG. 1, the root cause analysis (RCA) module **102-*a*, 102-*b* and 102-*c* has access to CDRs 150-*a*, 150-*b* and 150-*c*. The RCA module 102-*a*, 102-*b* and 102-*c* may have direct access to the CDRs 150-*a*, 150-*b* and 150-*c*, in fact, the CDRs 150-*a*, 150-*b* and 150-*c* may be part of the RCA module 102-*a*, 102-*b* and 102-*c* in some embodiments. However, the CDRs 150-*a*, 150-*b* and 150-*c* may be separate from the RCA module 102-*a*, 102-*b* and 102-*c***.

As used herein, a "CDR" is a record of a transaction of an individual call across a network. The CDRs **150-*a*, 150-*b* and 150-*c* represent a database including many CDRs. The anomaly detection module 100 and the RCA module 102 use the CDRs in the database 150-*a*, 150-*b*, 150-*c* to determine information about the network, for example, has an anomaly been detected and, if so, what is the root cause of that anomaly. A single CDR represents a single set of fields associated with a single transaction (call) in these datasets. The data fields that may be used in accordance with some embodiments of the present inventive concept are discussed below with respect to FIG. 2**. However, a CDR may include additional fields or fewer fields based on the anomaly detected. \

Referring to FIG. 2, a diagram illustrating the relevant fields in the CDR will be discussed. The CDR databases **150-*a*, 150-*b* and 150-*c* illustrated in FIG. 1 will be referred to herein collectively as "CDR database 150." As illustrated, each CDR 251 in the CDR database 150** includes the following fields: call_direction; call_type; carrier_name; customer_sbc_invite_time; customer_sbc_answer_time; customer_sbc_call_duration_in_milliseconds (ms); customer_sbc_device_name; customer_sbc_disconnect_time; customer_sbc_disconnecting_party; calling_number; calling_number_lata; called_number; called_number_country; and sip_reponse_code. Each field will be discussed below.

The call_direction refers to the direction of a call, from the service provider's perspective, for example, inbound or outbound calls. The call-type refers to the "type" of a call, as defined by the service provided. For example, call types may coordinate with product offerings and have different technical components. Common call types include emergency; international; international-internal; interstate; intrastate; local; tollfree-in and the like. The carrier name refers to a telecommunications provider. As used herein, "carrier" or "carrier name" refers to a telecommunications provider that receives the call from the network 145/148 first, i.e. the carrier that immediately receives the traffic, not any other intervening provider. For example, if a customer sends outbound international traffic to the network, the network might send this traffic to Carrier A **155-*a* who then might send it to Carrier B 155-*b*** and so on. Thus, the only known carrier information is the first Carrier to receive the data. Thus, all carriers in the flow may not be known. Similarly, for inbound calls, the carrier_name field may represent the carrier that passed the call to the provider. For example, Carrier A might send a call to the provider, who then might send the call to a customer. The carrier_name field here would be "Carrier A".

The customer_sbc_*_time fields, customer_sbc_invite_time, customer_sbc_answer_time and customer_sbc_disconnect_time are all fields in the CDR 251 that represent different timestamps associated with a single call, from the perspective of the network's session border controller (SBC) assigned to a particular customer. These fields are time stamps that indicate when the call invite happened and when the call was disconnected, respectively. It will be understood that other time fields may be present without departing from the scope of the present inventive concept.

The customer_sbc_device_name is a CDR field that represents the SBC on the customer edge that a call flows through. The SBC is a physical hardware device with special installed software that manages call flows in real time. A service provider may manage hundreds of SBCs distributed throughout the world.

The customer_sbc_disconnecting_party field indicates which side of the call terminated (ended) the call. For example, for outbound calls, a value of 1 in this field may indicate that the calling party ended the call, and a value of 2 in this field may indicate that the called party ended the call. A value of 0 is rare and indicates that a technical issue ended the call. This method is provided as an example only and other methods may also be used. In some embodiments, the disconnecting party is equivalent to which party sends a session initiation protocol (SIP) BYE direction. SIP is a protocol used in VoIP communications that allows users to make voice and video calls. A SIP BYE is a SIP request used to terminate a session.

The calling_telephone number field includes the phone number of the calling party and the called_telephone number field includes the phone number of the called party. The calling_number_lata field is the LATA from where the call was made. LATA refers to a federally defined geographical area. The called_number_country field includes the country where the called number is located.

The sip_response_code is a CDR field representing a final SIP response code of a call. Typical values may include 200, 403, 404, 486, 487, 503 and 550, although dozens of possible values exist. For example, a value of 200 indicates a call ended successfully, while other values indicate a call ended with particular errors. As discussed above, the CDR 251 of FIG. 2 is not an exhaustive list of CDR fields, but is provided as an example to allow discussion of a use case herein.

Figure 3:
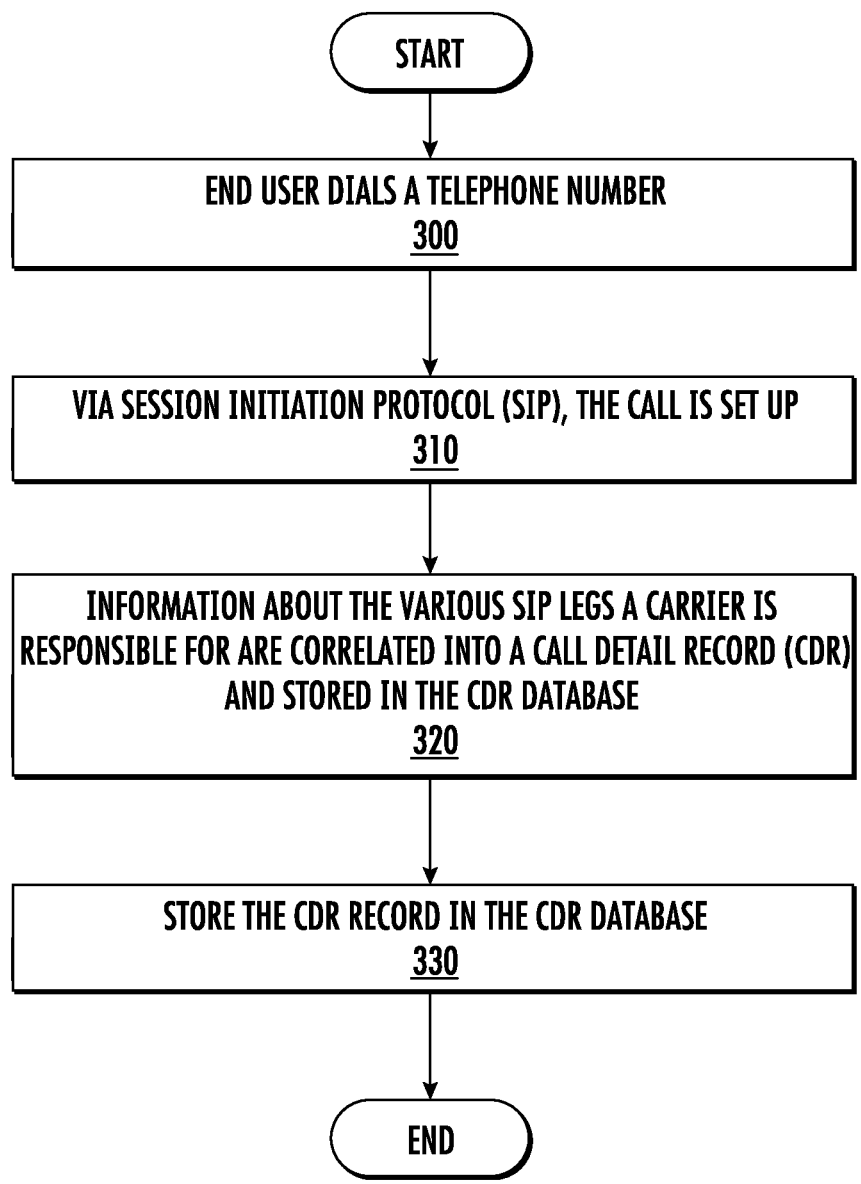
FIG. 3 is a flowchart illustrating operations for initiating a call and storing details thereof in a CDR in accordance with some embodiments of the present inventive concept.

Referring now to the flowchart of FIG. 3, an example of operations for beginning a call and storing the call details in a CDR 251 will be discussed. As illustrated in FIG. 3, operations begin at block 300 by an end user having the calling_number dial the called_number. In the conference call example, the end user dials a conferencing enabled telephone number, which creates the conference call. Via SIP, the call, for example, the conference call, may be set up (block 310). The various SIP legs used to set up and complete the call typically traverse multiple "carriers." Information about the individual SIP legs a single carrier is responsible for are correlated into the CDR 251 (block 320). The CDR 251 is then stored in the CDR database 150 (block 330). The operations illustrated in FIG. 3 may be performed on an ongoing basis as calls are made. The flowchart of FIG. 3 is provided as an example only and, thus, it is understood that CDRs can be created using different operations.

Although embodiments of the present inventive concept are discussed herein with respect to SIP calls, it will be understood that embodiments of the present inventive concept are not limited thereto. For example, embodiments discussed herein can be used for HTTP calls. The methods and systems discussed herein receive correlated CDRs with the correct fields and time ranges, process these fields as discussed herein and return a result. The methods and systems discussed herein are indifferent to how the call happened, or the technical details needed to actually create the correlated CDR.

Figure 4:
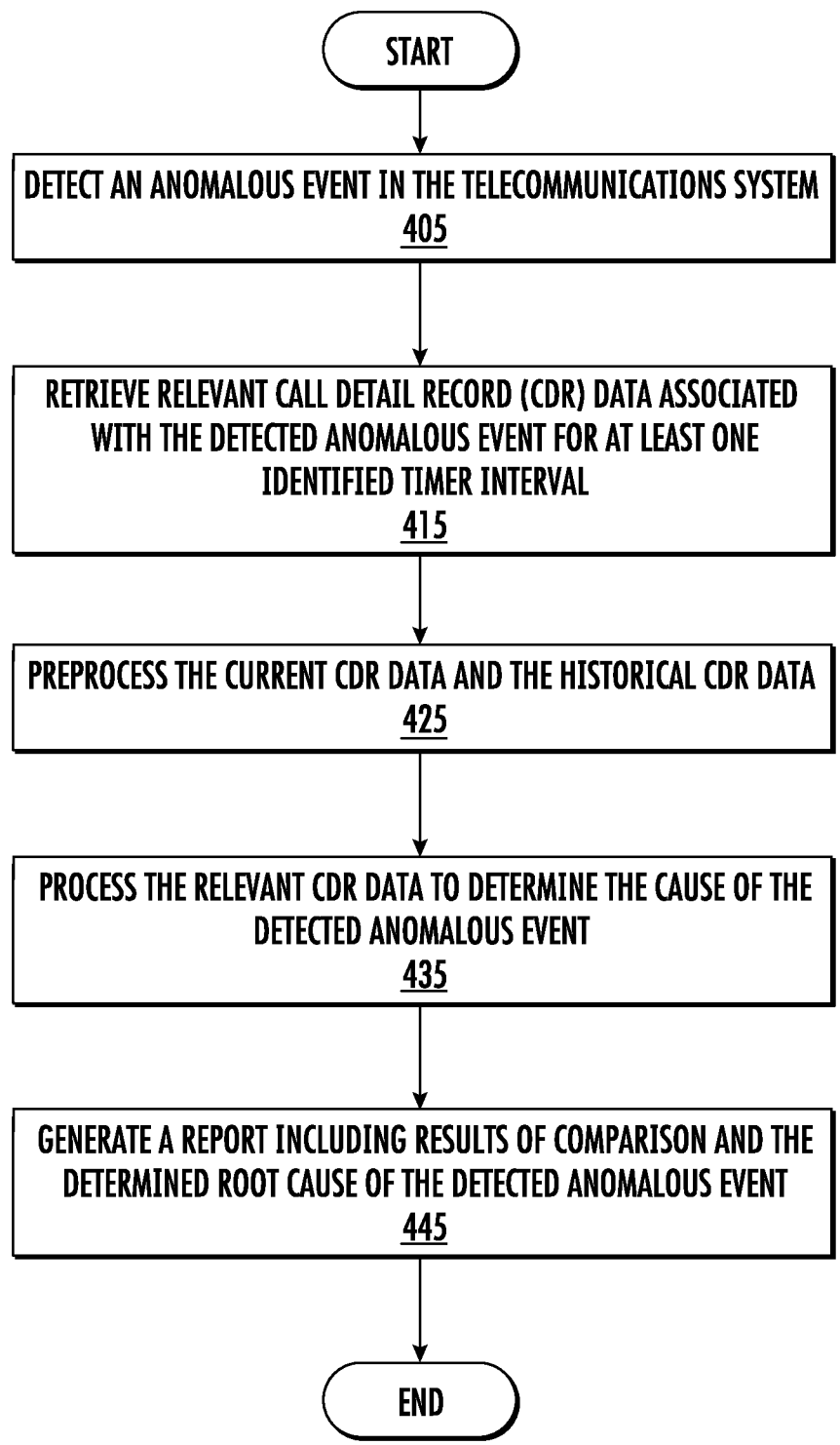
FIG. 4 is a flowchart illustrating operations for determining a root cause of a detected anomaly in accordance with various embodiments of the present inventive concept.
Figure 5:
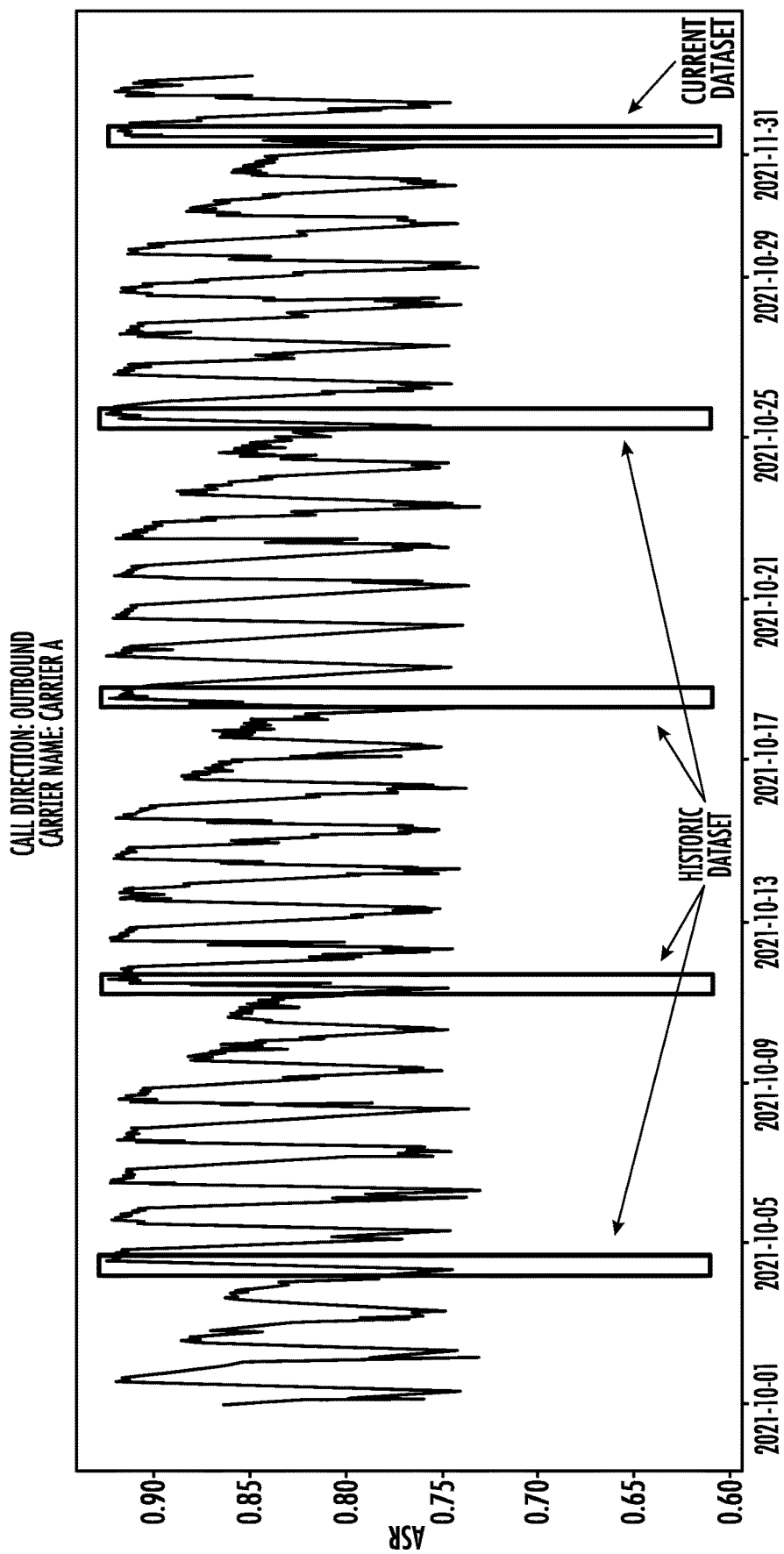
FIG. 5 is a graph illustrating current and historical CDR data associated with an identified anomaly in accordance with some embodiments of the present inventive concept.

Referring now to the flowchart of FIG. 4, operations for determining a cause of a detected anomalous event in accordance with some embodiments of the present inventive concept will be discussed. As illustrated in FIG. 4, operations for determining a cause of a detected anomalous event in a telecommunications system begin at block 405 by detecting an anomalous event in the telecommunications system. As discussed above, embodiments discussed herein assume that an anomaly has been detected and proceed with operations of determining the root cause thereof. The anomaly may be detected using any method known to those having skill in the art without departing from the scope of the present inventive concept.

For example, in some embodiments, the anomaly is detected using an automated anomaly detection process. In other words, there is an existing automated anomaly detection process that detects anomalous events. Although the details will not be discussed herein, the process is performed using machine learning techniques and models, as well as statistical methods. Once the anomaly is detected, information about the anomaly is sent to, for example, the RCA module 102 (FIG. 1) discussed above and the relevant CDR data is "fetched" (obtained) as discussed herein. This CDR data may then be processed through the automated RCA method in accordance with some embodiments of the present inventive concept.

In alternative embodiments, an ad hoc method of identifying anomalies may be used instead of the automated method discussed above. For example, an event might come to a user's attention via a process other than automated anomaly detection. For example, a user might be asked to perform the automated RCA method discussed herein on an event after a network outage, or to support a customer conversation. In these embodiments, the user provides the necessary CDR data to an automated RCA application. The CDR data is then passed through the automated RCA method discussed herein. In some embodiments, the user may select which CDR data needed for the automated RCA application could fetch the data from a CDR database. In other words, these embodiments, the automated method does not detect the anomaly, the anomaly is identified by some other means and then the method discussed herein is used to determine the root cause of the identified anomaly.

Referring again to FIG. 4, once the anomaly has been detected, relevant CDR data is retrieved associated with the detected anomalous event for at least one identified time interval (block 415). As used herein, "time interval" refers to the interval used to detect an anomalous event in time series data. In the examples discussed herein, the ISO-8601 recommended format of 2021-10-29 12:00:00/2021-10-29 12:10:00 will be used to denote the start and end time of time intervals. However, embodiments of the present inventive concept are not limited to this configuration.

The relevant CDR data includes both current CDR data for the at least one identified time period and historical CDR data for past intervals corresponding to the at least one identified time interval. In particular, in some embodiments of the automated RCA method discussed herein, two distinct CDR datasets are used. The two data sets will be referred to herein as a "current dataset" and a "historical dataset." The current dataset contains all of the relevant CDRs used to detect an anomaly, or to fully describe an anomalous event. For example, an anomalous event may have been detected for outbound traffic (call_direction) sent to Carrier A for calls ending between 2021-11-01 12:00:00 and 2021-11-01 12:10:00 (at least one identified time interval). For example, the anomaly may be indicated by an answer-seizure rate (ASR) of this timeframe (interval) for outbound traffic sent to Carrier A that is drastically lower than a machine learning model predicted.

ASR is one metric that may be used to detect an anomaly. For time series anomaly detection in telecommunications data, common metrics include ASR, volume of attempted calls (CVA); volume of failed calls (CVF); and volume of successful calls (CVS). When performing anomaly detection and root cause analysis as discussed herein, ASR data may be monitored over time across, for example, call_direction and carrier_name combinations. The combination of call_direction and carrier_name is referred to as "monitoring aggregation." Alternatively, CVA may be monitored over time across calling_number_lata and customer_sbc_device_name combinations. Here, the combination of calling_number_lata and customer_sbc_device_name is the monitoring aggregation. Monitoring aggregation may be denoted generally as field_1; field_2; field_3. For the above examples, this equates to call_direction; carrier_name and calling_number_lata; customer_sbc_device_name.

"Lagged observations" refers to observations that occur prior to the current time interval. In particular, the examples set out below utilize one-week, two-week, three-week and four-week lagged observed metric values. For example, if the metric in question is ASR for the carrier (e.g. Carrier A) origination and an anomaly was detected for the time interval 2021-10-29 12:00:00/2021-10-29 12:10:00: the one-week lagged observation is the ASR value for Carrier A origination from the time interval 2021-10-22 12:00:00/ 2021-10-22 12:10:00; the two-week lagged observation is the ASR value for Carrier A origination from the time interval 2021-10-15 12:00:00/2021-10-15 12:10:00" and so on.

A z-Test of proportions is an example of a statistical hypothesis test used to determine if two observed proportions are from the same underlying populations, or if there is a statistically significant reason to believe the two observed proportions were taken from different populations. For example, given two CDR datasets, one containing 1000 CDRs from a current time interval and one containing 1500 CDRs from a historical time interval, the proportion of successful calls for all attempted calls may be determined for each dataset. This metric is commonly referred to as the ASR in the telecommunications industry. If the ASR for the current time interval is determined to be 0.64 and the ASR for the historical time interval is determined to be 0.94, the z-Test of Proportions can be used to determine if these two ASR values are from the same underlying population of CDRs, or if there is statistically significant reason to believe they are from different underlying CDR datasets. It will be understood that the following conditions (sometimes called assumptions) must be satisfied for the test to be deemed valid. In the historical dataset, ten successful observations and ten non-successful observations must be present. In the current dataset, ten successful observations and ten non-successful observations must be present. It will be understood that the z-test of proportions is provided as an example test that may be used, embodiments of the present inventive are not limited thereto.

Referring again to the anomaly indicated by an ASR for a particular time interval for outbound traffic sent to Carrier A that is drastically lower than a machine learning model predicted. As discussed above, other metrics may be used. The current dataset for this anomalous event may contain all CDRs where the following is true (CDR field have been defined above):
call_direction="outbound" AND carrier_name="Carrier A" AND (customer_sbc_disconnect_time≥"2021-11-01 12:00:00" AND customer_sbc_disconnect_time<"2021-11-01 12:10:00")

For sake of example, assume the current dataset contains 1000 CDRs. In contrast, the historical dataset may contain all of the analogous CDRs as the current dataset from, for example, the prior four weeks for the exact same weekly time interval. For example, for the anomalous event described above, the historical datasets would contain all of the CDRs where the following is true:
call_direction="outbound" AND carrier_name="Carrier A" AND (#1 week before anomalous event time frame (customer_sbc_disconnect_time≥"2021-10-25 12:00:00" AND customer_sbc_disconnect_time<"2021-10-25 12:10:00")
OR #2 weeks before anomalous event time frame (customer_sbc_disconnect_time≥"2021-10-18 12:00:00" AND customer_sbc_disconnect_time<"2021-10-18 12:10:00")
OR #3 weeks before anomalous event time frame (customer_sbc_disconnect_time≥"2021-10-11 12:00:00" AND customer_sbc_disconnect_time<"2021-10-11 12:10:00")
OR #4 weeks before anomalous event time frame (customer_sbc_disconnect_time≥"2021-10-04 12:00:00" AND customer_sbc_disconnect_time<"2021-10-04 12:10:00"))

This current dataset and historical datasets discussed above are visually illustrated in FIG. 4.

It will be understood that the use of four prior weeks is only provided as an example and is entirely subjective. The number of weeks can be changed or even optimized. For example, using six, eight, or perhaps more weeks may provide similar automated RCA results. The goal of retrieving the historical CDR data is to create a historical dataset that the current dataset can be compared too. The telecommunications traffic of interest here follows a weekly pattern, known as "weekly periodicity." For a telecommunications traffic type that follows a strong daily or monthly periodicity, prior days or months may be more appropriate than weeks.

Once the current and historical CDR data is retrieved, the current CDR data and the historical CDR data may be preprocessed or "cleaned" (block 425). Preprocessing encompasses various steps to maintain data consistency, and simply preprocess the data to prepare for false positive reduction and root cause analysis discussed below.

In particular, the current and historical CDR data may be preprocessed for subsequent steps in the method by, first, checking the actual CDR fields present in the historical and current dataset to ensure they match the expected fields. This step increased the likelihood that no CDR fields are missing and/or no extra CDR fields are present. Then, once confirmed that the correct fields are present, one or more CDRs fields may be coerced, or forced, to be the correct "data type." Typically, most modern data processing and analytical tools, such as Python's "pandas" package or R's tidyverse library, have standard "data types." These data types may include, for example, string, integer, float, and datetime data types. Thus, in some embodiments, the customer_sbc_disconnect_time CDR field may be coerced to be a datetime data type, while the calling_number field may be coerced to be a string data type. The remaining CDR fields may be similarly coerced to be appropriate data types as well. It will be understood that data type coercing may be especially important for fields that may be read in as one data type, but are actually a different type. For example, the sip_response_code field is represented entirely by three digit strings, such as "480" or "503". Often this field is incorrectly read in as an integer type, when it should be a string type.

It will be further understood data type is not limited to one of string, integer, float, and datetime and that other types, such as Boolean data types, also exist. Many languages also have more specific types. Python for example has different float types based on bit memory precision, for example, float8, float32, float64 and the like.

The current and historical CDR data may be further coerced by ensuring that the calling_number and called_number fields contain the entire appropriate country calling code, or if the historical and current datasets only contain CDRs from a single country, the country calling code can be removed entirely. For example, when performing automated RCA in accordance with embodiments discussed herein on U.S. phone numbers to U.S. phone numbers, the country calling code of "+1" can be entirely removed. Some carriers pass the "+1" with a phone number in the SIP payload, while others do not, so it may be necessary to handle this inconsistency. This step is useful when determining how many calls a certain phone number made or received. If the phone number 9191234567 is denoted as both "9191234567" and "+19191234567", then summing calls by phone number without cleaning the phone number would result in incorrect results. In the event of performing automated RCA in accordance with embodiments discussed herein on CDRs from multiple countries to multiple countries, the country calling code may be added to all phone numbers as appropriate.

Figure 6:
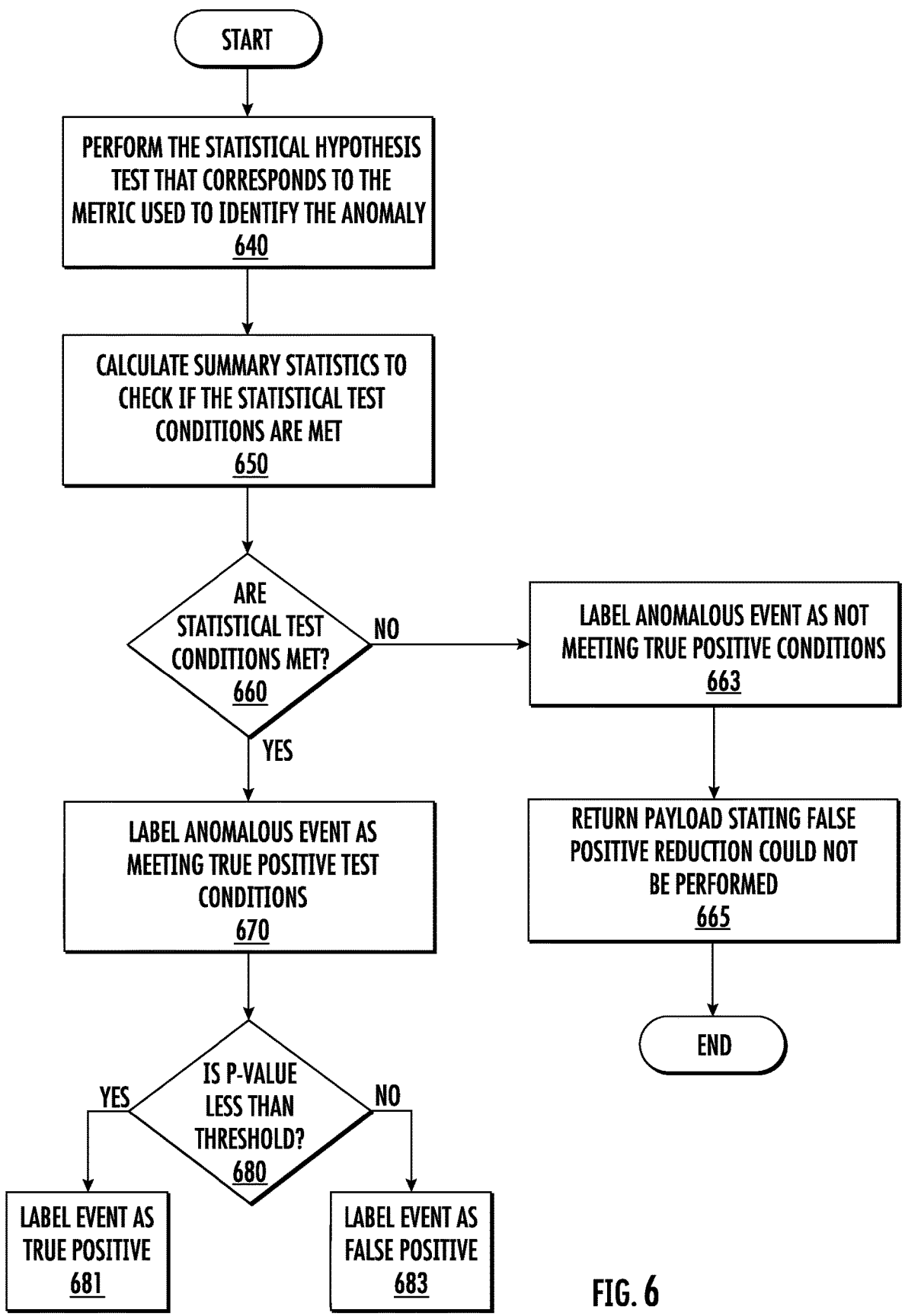
FIG. 6 is a flowchart illustrating operations for determining false positives in accordance with some embodiments of the present inventive concept.

Although not illustrated in the flowchart of FIG. 4, in some embodiments of the present inventive concept, after the current and historical CDR data is preprocessed as discussed above with respect to block 425, embodiments of the present inventive concept confirm that the detected anomalous event is a true positive event, i.e. a false positive reduction method is performed. As used herein, "false positive reduction" refers to a process of eliminating false positive events. This process would be performed before the automated RCA method discussed herein. Operations of the false positive reduction process will be discussed with respect to the flowchart of FIG. 6.

As discussed above, to properly implement the automated RCA method discussed herein, the historical and current datasets must be fetched properly and preprocessed. Once fetched and preprocessed, in some embodiments, the anomalous event may be verified as a "true positive." This is important because an entity does not want to spend the time and effort locating the root cause of an anomaly if it is not actually an anomaly. Referring first to block 640 of FIG. 6, depending on which metric (discussed above) was used to detect the anomalous event, false positive reduction may be performed using the appropriate statistical hypothesis test. In particular, if ASR is the metric, two-sample z-Test of Proportions is performed; if CVA is the metric, Chi-squared Test of Homogeneity is performed; if CVF is the metric, two-sample z-Test of Proportions is performed; and if CVS is performed, the two-sample z-Test of Proportions is performed.

The details of the z-Test of Proportions is discussed above. The Chi-squared Test of Homogeneity is a statistical hypothesis test used to determine if the observed distribution of observations across two categorical variables are from the same underlying population, or if there is statistically significant reason to believe they are taken from different underlying populations. For example, the distribution of SIP response codes may be expected to be similar across a current CDR dataset and a historical CDR dataset. However, it may be observed that the historical dataset has 1000 SIP 200s, 50 SIP 404s, and 20 SIP 487s and that the current dataset has 500 SIP 200s, 50 SIP 404s, 520 SIP 487s. A Chi-squared Test of Homogeneity can determine if the two distributions are from the same underlying population, for example, from a service provider's typical call traffic behavior, or if there is statistically significant reason to believe they are from different underlying populations, for example, the current dataset is from an anomalous population of call traffic while the historical dataset is from a population of typical call traffic behavior. It will be understood that conceptually, this test is run on two columns of data. Generally, the following assumptions may be made for the test to be deemed valid: across both of the historical and current datasets, there must be at least a combined total of 50 observations; in the two-way table of count observations necessary for a Chi-squared Test of Homogeneity, at least 80% of the cells must have an expected count of greater than or equal to five.

Referring again to FIG. 6, operations proceed to block 650 by calculating the relevant "summary statistics" that match the metric from the historical and current CDR datasets. For example, for an anomalous event detected via a drop in ASR, the ASR value for the historical and current datasets is calculated and then used in the appropriate statistical hypothesis test. Similarly, for an anomalous event detected via an increase in CVF, the CVF for the historical and current datasets is calculated and then used in the appropriate statistical hypothesis test. It will be understood that these are provided for example only, therefore, embodiments are not limited to the examples discussed herein. For example, it would be possible to store the summary statistics in an additional database without departing from the scope of the present inventive concept.

For each of the statistical hypothesis tests, various conditions about the underlying datasets need to be met (block 660). These conditions essentially ensure that the test results are valid, and that the results can be accurately interpreted. Each of the conditions are checked and met before acting on the results of the statistical hypothesis test. In statistical hypothesis testing, statistical significance refers to the significance of a result after a given test is performed. Essentially, the result of a statistical hypothesis test describes the probability that the result occurred under some hypothesis. When the determined probability, known as a p-value, is found to be below a predetermined significance level, it is concluded that the result is statistically significant.

At block 660, it is determined if the statistical test conditions are met. If it is determined that the statistical hypothesis test conditions are met (block 660), the anomalous event is labeled as meeting the relevant test conditions (block 670) and it is determined if the resulting p-value is below the predetermined statistical significance level (block 680). If the p-value is determined to be below the predetermined threshold, i.e. statistically significant, the event is deemed to be a true positive anomaly (block 681) and the automated RCA application continues as will be discussed below. If on the other hand, the p-value is determined to be greater than the threshold (block 680), the anomalous event is deemed to be a false positive anomaly (block 683) and, therefore, operations do not proceed to the automated RCA method and instead returns a payload stating the anomaly was determined to be a false positive.

Referring back to block 660, if it is determined that the statistical hypothesis test conditions are not met, the results of the statistical hypothesis test are deemed invalid and the p-value is irrelevant and the anomalous event is labeled as not meeting the relevant test conditions (i.e., the results of the test are considered invalid) (block 663). In this event, the automated RCA application does not continue with the below steps, and instead returns a payload stating that false positive reduction could not be performed (block 665). Some embodiments of the present inventive concept may include bootstrap resampling to provide more consistent results.

Referring again to FIG. 4, in embodiments where the false positive reduction methods are not used, operations proceed from preprocessing the current and historical CDR data to processing the relevant CDR data to determine the root cause of the detected anomalous event (block 435). It will be understood that processing the current CDR data and the historical CDR data comprises comparing the current CDR data and the historical CDR data during at least one substantially similar time interval to determine the cause of the detected anomalous event.

Conventionally, identifying anomalies in a system and determining their root cause, consisted of dozens of individuals watching dozens of graphs and alert boards at the same time. For example, these individuals would monitor plots on screens displaying all kinds of telecommunications KPIs, from SBC memory utilizations to call volumes by region, and much more. In telecommunications, something is always going wrong. The system is just too large to always work perfectly. And when things go wrong, operators need to figure out why, and then go fix it.

Embodiments of the present inventive concept provide an automated way of identifying, broadly, anything that helps a network operator or engineer figure out a root cause of a detected anomaly and fix the problem more efficiently. Accordingly, in some embodiments, a "report" is generated that includes an indication of the comparison result and the determined root cause of the detected anomalous event (block 445). As used herein, "report" refers to a communication that provides information about a detected anomaly. In some embodiments the report may be a small payload attached to an incoming alert, stating the result of a true positive test and the determined root causes. Thus, from the perspective of an engineer, this would remove the need to "figure out what went wrong," and the engineer could spend more time fixing the issue related to the detected anomaly, and do so with more precision that human analysis.

For example, in some embodiments, the root cause may be determined to be a called phone number that is being flooded with calls resulting in a number of user busy errors, for example, SIP 487 errors. In these embodiments, the RCA system in accordance with embodiments of the present inventive concept may generate a report (block 445) describing the anomalous event and the determined root cause and provide/forward the report to the appropriate entity, for example, a phone number management team. The telephone number experiencing the anomaly identified in the report may then be subject to various actions. For example, the telephone number identified in the report may be temporarily (for a predetermined time period) blocked from receiving inbound calls, either completely or from specific sources. Blocking may be preceded by a determination that inbound calls for this telephone number may be blocked by, for example, looking up the telephone number in a database of numbers that can be blocked. After the predetermined time period has expired, inbound traffic to the telephone number identified in the report may be resumed and it may be determined if the anomaly is still present. The aforementioned steps may be automated within the RCA system of the carrier network or between the RCA system and another linked system of the carrier network configured to carry out the remedial measures without departing from the scope of the present inventive concept.

By way of further example, in some embodiments of the present inventive concept, the root cause of the detected anomaly may be determined to be something being done by a carrier. In these embodiments, the RCA system in accordance with embodiments of the present inventive concept may generate a report (block 445) describing the anomalous behavior and the determined root cause and provide/forward the report to the carrier. The carrier experiencing the anomaly identified in the report may then be subject to various actions. For example, if the severity of detected anomaly is deemed relatively severe, traffic may be automatically routed around the carrier causing the anomaly for a period of time. After expiration of the period of time or after the carrier shows that the cause of the anomalous behavior has been addressed, test traffic may be routed to the carrier to ensure that the root cause of the anomaly has been addressed and the carrier is no longer experiencing the anomaly. If the test traffic does not show signs of the detected anomaly, the bypassing of the carrier may be automatically terminated and traffic may be routed through the carrier again. The aforementioned steps may be automated within the RCA system of the carrier network or between the RCA system and another linked system of the carrier network configured to carry out the remedial measures without departing from the scope of the present inventive concept.

In some embodiments of the present inventive concept, the root cause of the detected anomaly may be determined to be something being done by a device. In these embodiments, the RCA system in accordance with embodiments of the present inventive concept may generate a report (block 445) describing the anomalous behavior and the determined root cause and provide/forward the report to the appropriate party, for example, a member of the engineering team. The device experiencing the anomaly identified in the report may then be subject to various actions. For example, traffic may be automatically routed around the device for a period of time or until it can be demonstrated that the anomaly has been addressed. In particular, once the device has been bypassed, the cause of the detected anomaly may be addressed at the device. Once the anomaly has been addressed, the device may be restored so that it can send and receive traffic. In some embodiments, the device may require restarting, reconfiguring, updating or the like before it can be restored. In some embodiments, the device may be automatically restored. The aforementioned steps may be automated within the RCA system of the carrier network or between the RCA system and another linked system of the carrier network configured to carry out the remedial measures without departing from the scope of the present inventive concept.

In further embodiments, the root cause may be determined to be a historically known internet protocol (IP) address, calling phone number, carrier or the like. In these embodiments, once it is determined that the root cause includes these known entities, a report may be automatically generated and sent to the appropriate enforcement agency, for example, the Federal Communications Commission (FCC). In these embodiments, the RCA system in accordance with embodiments of the present inventive concept may also send the report to the appropriate local entity, for example, a fraud department. The known entity causing the anomaly identified in the report may then be subject to various actions. For example, traffic may be automatically blocked from the IP address, calling phone number, carrier or the like. After expiration of a predetermined period of time or after assurance that the fraudulent event no longer exists, traffic from the blocked IP address, calling phone number, carrier or the like may be reinstated automatically.

In some embodiments, the root cause of the detected anomaly may be determined to be a customer that is, for example, sending far too much traffic. This may be caused by, for example, a looping bug. In these embodiments, the RCA system in accordance with embodiments of the present inventive concept may generate a report (block 445) describing the anomalous behavior and the determined root cause and provide/forward the report to the appropriate party, for example, the customer management team. The customer experiencing the anomaly identified in the report may then be subject to various actions. For example, a "rate limit" may automatically be imposed for the customer's traffic. In other words, the amount of traffic that the customer is allowed to send may be automatically limited. Other precautionary remedial actions may also be taken without departing from the scope of the present inventive concept. After the customer shoes that they have addressed the issue associated with the anomaly, the customer may be allowed to send traffic at the contracted rate.

It will be understood that although embodiments of the present inventive concept are discussed herein in the context of the system 101, embodiments of the present inventive concept are not limited to this configuration. For example, further embodiments may be directed to systems including mobile phones and mobile phone towers without departing from the scope of the present inventive concept.

Details of operations for automated RCA in accordance with embodiments discussed herein will now be discussed with respect to the flowcharts of FIGS. 7A and 7B. Embodiments of the present inventive concept illustrated in the flowchart of FIGS. 7A and 7B will be performed after the data is collected and preprocessed, automated false positive reduction is optionally performed, the conditions of the statistical hypothesis test are met, and the resulting p-value is below the predetermined statistical significance level. It will be understood that embodiments illustrated in FIGS. 7A and 7B are provided for example only and, therefore, embodiments of the present inventive concept are not limited thereto.

As discussed above, although examples discussed herein refer to SIP call, embodiments of the present inventive concept are not limited thereto. Some embodiments may include HTTP calls without departing from the scope of the present inventive concept.

Figure 7A:
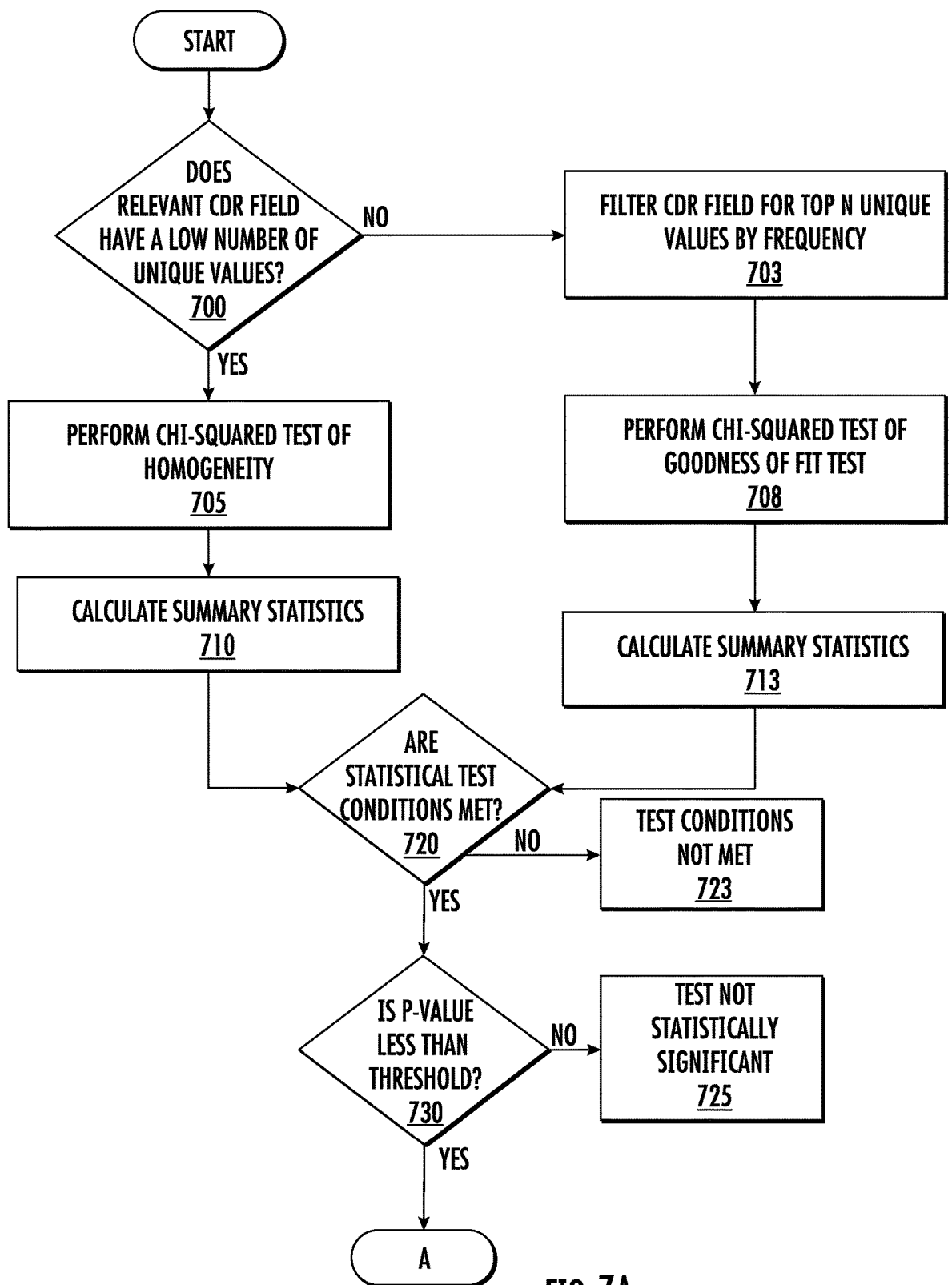
FIGS. 7A and 7B are flowcharts illustrating operations of the autonomous RCA method in accordance with some embodiments of the present inventive concept.
Figure 7B:
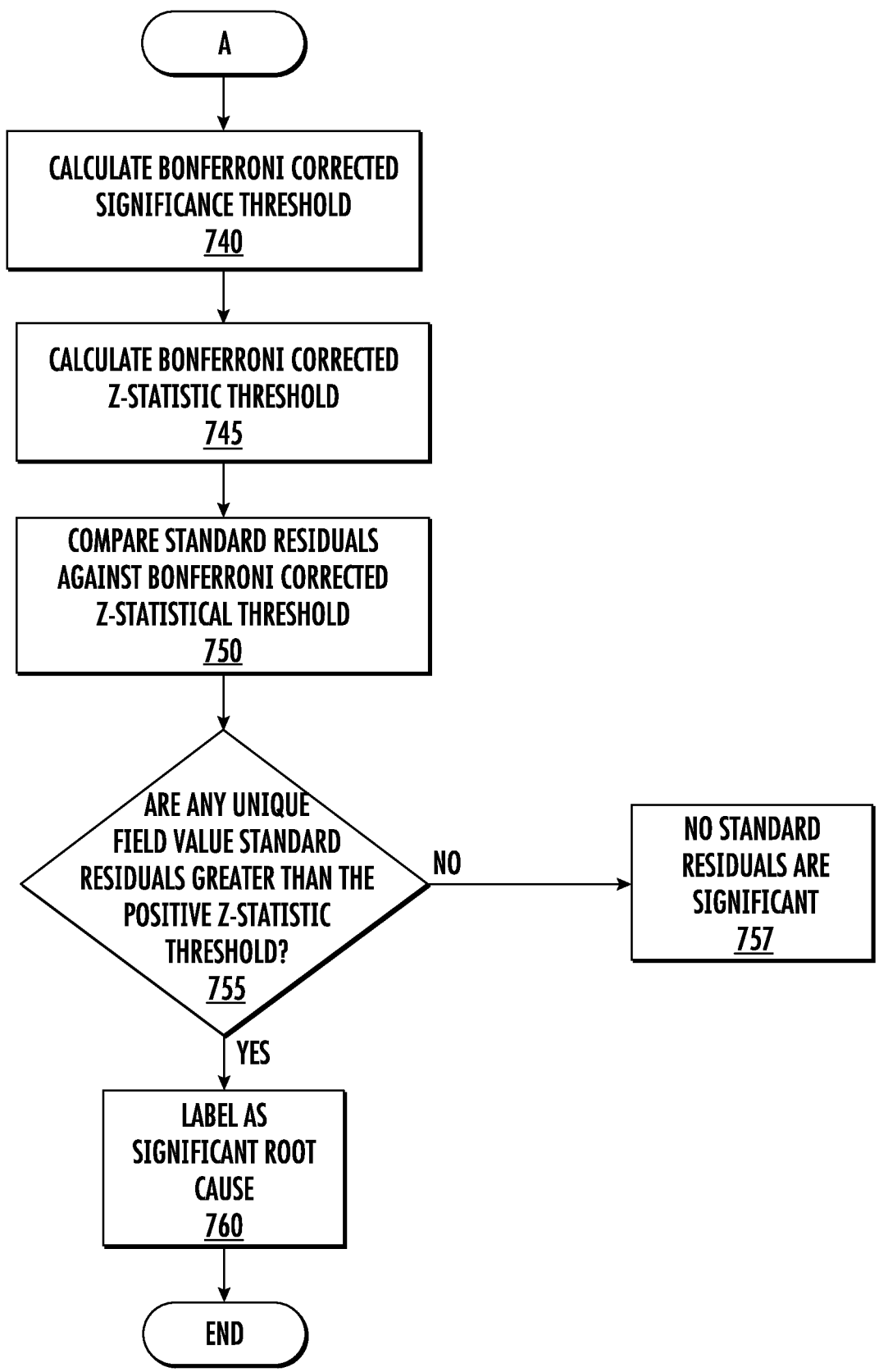

Referring now to FIG. 7A, operations of automated RCA in accordance with some embodiment discussed herein begin at block 700 by determining if the relevant CDR field, for, example, sip_response_code, carrier_name, customer_sbc_device_name or customer_sbc_disconnect_party, has a low number of possible unique values (block 700). By way of example, the sip_response_code CDR field may be examined. The count of sip_response_code values across the historical and current datasets are computed. A screenshot showing an example two-way table of sip_response_code counts for the historical and current datasets is shown in FIG. 8. A Chi-squared Test of Homogeneity is performed on the sip_response_code data (block 705) and summary statistics are calculated (710). The Chi-squared Test of Homogeneity is performed on the table illustrated in FIG. 8, which has been filtered for where count>5. In some embodiments it may be necessary to filter out low count values for stability. In particular, the Chi-Square test does not apply to low volume observations as the results may be too inconsistent to have meaningful statistically significant conclusions.

The operations of blocks 700-710 are relevant to CDR fields having a low number of possible unique values, i.e. low cardinality fields like sip_response_code. The analysis is the same for all low-cardinality fields, the only difference is the field being analyzed. For example, screenshots related to customer_sbc_device_name field are provided in FIGS. 9 and 10.

As illustrated in FIG. 7A, there are two parallel processes illustrated for the automated-RCA, which are slightly different. The right side including blocks 700-710 is for the low-cardinality fields as discussed above and right side including blocks 703-713 are directed to the process for high-cardinality fields. These different methods are needed because, for high-cardinality fields, the automated-RCA process described above is inconsistent, as the probability of having similar values in both the historical and current datasets decreases. Conceptually, there is no guarantee calling_number from last week will appear in data from this week. There are just too many possible phone numbers in the world. It will be understood, the distinction between what field is low-cardinality versus high-cardinality is subject, and based more on domain knowledge than a particular number. For the five fields listed above, carrier_name, customer_sbc_device_name and customer_sbc_disconnect_party are considered low-cardinality, while calling_number and called_number are considered high-cardinality. As illustrated in FIG. 7A, for the high-cardinality fields, the Chi-squared test of goodness fit is used instead of the chi-squared test of homogeneity. However, once the process gets to block 720 where it is determined if the statistical test (whichever one) is met, the process is the same. Thus, blocks 703-713 will be discussed and then proceed with blocks 720 and down.

With respect to the operations of blocks 703-713, if it is determined at block 700 that the field does not have a low number of possible unique values (high-cardinality), for example, for CDR fields like calling_number and called_number, then the field is filtered for the top N unique values by frequency 703. N can be any whole number. Then, the Chi-Squared Goodness of fit test is performed on the data (block 708). Different from the Chi-Squared Test of Homogeneity, the Chi-squared Goodness of Fit Test is a statistical hypothesis test used to determine if the difference in the observed distribution of observations across a categorical variable are statistically significant from the expected distribution across the same categorical variable. For example, the distribution of SIP 404s (and error message) may be expected to be uniform across three phone numbers. However, phone number A may be observed to have five times the number of SIP 404s as phone numbers B and C. A Chi-squared Goodness of Fit Test determines if the observed distribution is due to random chance or not. It will be understood that this test is run on a single column of data. The following conditions (sometimes called assumptions) must be satisfied for the test to be deemed valid. Across the dataset, there must be at least a combined total of 50 observations. In the one-way table of count observations necessary for a Chi-squared Goodness of Fit Test, at least 80% of the cells must have an expected count of greater than or equal to five. In the one-way table of count observations necessary for a Chi-squared Goodness of Fit Test, none of the cells have an expected count of zero. Once the test has been completed, summary statistics are calculated (block 713).

Starting at block 720, regardless of statistical test, it is determined if the statistical conditions are met for the test performed (block 720). If the conditions are not met (block 720), a conditions not met message is returned (block 723). If the conditions are met (block 720), it is determined if the p-value is less than p-value threshold (block 730). If the p-value is greater than the threshold (block 730), then the test is not considered statistically significant (block 725). If, on the other hand, the p-value is determined to be less than the p-value threshold (block 730) and, therefore, statistically significant, operation proceed to block 740 of FIG. 7B to continue the automated RCA in accordance with some embodiments of the present inventive concept.

Referring now to FIG. 7B, if the Chi-squared Test of Homogeneity/Chi-squared test of goodness fit is found to be statistically significant and the test conditions are met, the distribution of sip_response_code observations in each of the historical and current datasets is from a different underlying population of CDRs. It may be assumed that the current dataset is from an anomalous underlying population, although the test does not explicitly state this result. At this point, nothing can be stated about which sip_response_code values are different, just that the overall distributions are different. Thus, the next step in the automated RCA process determines which, if any, observed sip_response_code values are contributing to the results of the statistical test. Essentially, if the overall test is statistically significant, the results of the test can be explored to determine which, if any, individual sip_response_code values are pushing the overall test to be significant Referring now to FIG. 7B, operations proceed to block 740 when the p-value is determined to be less than a threshold p-value and a Bonferroni corrected significance threshold is calculated. In statistical hypothesis testing, there is a situation known as the Multiple Comparisons Problem. Essentially, when performing multiple statistical significance tests simultaneously, the likelihood of the results of an individual significance test appearing significant purely by chance increases. Thus, some results may be believed to be true when they are not. The Bonferroni correction is one method of controlling for this increased likelihood, although others exist and embodiments of the present inventive concept are not limited thereto.

Once the Bonferroni corrected significance threshold is calculated, the Bonferroni corrected z-statistic threshold is calculated (block 745). The Bonferroni corrected z-statistic is then compared to the standard residuals (block 750). Across statistics and machine learning, a residual refers to the difference between an observed value and an expected or predicted value. A standardized residual refers to a residual that has been standardized. There are multiple methods of standardizing residuals, and exact formulas and names vary between contexts. A common method of standardizing a residual is to divide the residual by the square root of all residuals, however, embodiments of the present inventive concept are not limited thereto.

Thus, the standardized residuals of the Chi-squared Tests are analyzed by comparing them against another predetermined statistical significance level. Because the standardized residuals are standardized, they are compared to a z-score that has been calculated from the predetermined statistical significance level. However, due to the Multiple Comparisons problem, the standardized residuals are compared to a Bonferroni Corrected significance level, that has then been converted into a z-score. This corrected significance level controls for the issue created by the Multiple Comparisons problem. It will be understood that there are other methods of controlling for this problem, such as the Šidák correction or the Holm-Bonferroni method, which will not be discussed further herein.

The screenshot of FIG. 11 illustrates both the current and historical standardized residuals for the same sip_response_code count data from above. In practice, it may be determined which of the above standardized residuals is statistically significant using a significance level of 0.01. From the Bonferroni correction, this significance level is reduced to (0.01)/(# of cells)=0.01/10=0.001. The Bonferroni corrected significance level is converted into a z-Score as discussed above. The corresponding z-score in this example is approximately 3.2905267314918945. Finally, each standardized residual above is compared to this z-score. In particular, the data is filtered for any sip_response_codes where: the historical standardized residual is less than the negated z-score; and the current standardized residual is greater than the z-score. In context of the present inventive concept, the sip_response_code values where the standardized residual is higher than expected for the current dataset are relevant. This indicates more observations of that particular sip_response_code are present. In the context of the above example, only the sip_response_code value of 404 meets these requirements.

In particular, −12.597148 (FIG. 11)< −3.2905267314918945, and 12.597148> 3.2905267314918945. In practice, a SIP 404 error is often a "phone number not found" error. This anomalous event is related to a SIP 404 error. More SIP 404 errors occurred during the current dataset than would be expected when compared to the historical dataset. It may be hypothesized that one, or many unknown phone numbers are being dialed. The remainder of the automated RCA process can confirm or deny the hypothesis.

In particular, the data sets may be filtered for significant sip_response_code values. For example, when automated RCA is performed on the sip_response_code field, and the Chi-squared Test of Homogeneity is found to be significant; the conditions of the test are met; and future analysis of the standardized residuals determined particular sip_response_code values that are anomalous, the historical and current datasets are filtered for only CDRs containing the significant sip_response_code values.

At block 755, it is determined if there are any unique field value standard residuals greater than the positive z-statistic threshold. If it is determined that unique field value standard residuals greater than the positive z-statistic threshold exist, these fields are labeled as significant root causes (block 760). In the event that each of the above conditions are not met, an appropriate payload is returned from the automated RCA application (block 757). The historical and current datasets are filtered for only CDRs containing the significant sip_response_code values because, conceptually, after determining which SIP error codes are being returned more than is expected, it need to be determined, for other CDR fields, if there are particular values being returned more than it is expected. For example, for the above example where it was determined that the SIP 404 code is statistically significant, it may be hypothesized that a particular hardware device is returning this error, or a particular carrier is returning the error, or a robo-dialing machine is looping over a single phone number.

It will be assumed going forward that the historical or current datasets have been filtered for only CDRs containing the significant sip_response_code values. Performing automated-RCA in accordance with embodiments discussed herein with respect to other fields will be discussed. After filtering the historical and current datasets for only CDRs containing the significant sip_response_code values, automated RCA is performed on other CDR fields. For example, carrier_name, customer_sbc_device_name, customer_sbc_disconnect_party, calling_number, and called_number. However, many other CDR fields, such as calling_number_lata or call_type are appropriate for the automated RCA discussed herein. Essentially, any categorical field in the CDRs is appropriate for the method described herein.

Figure 12:
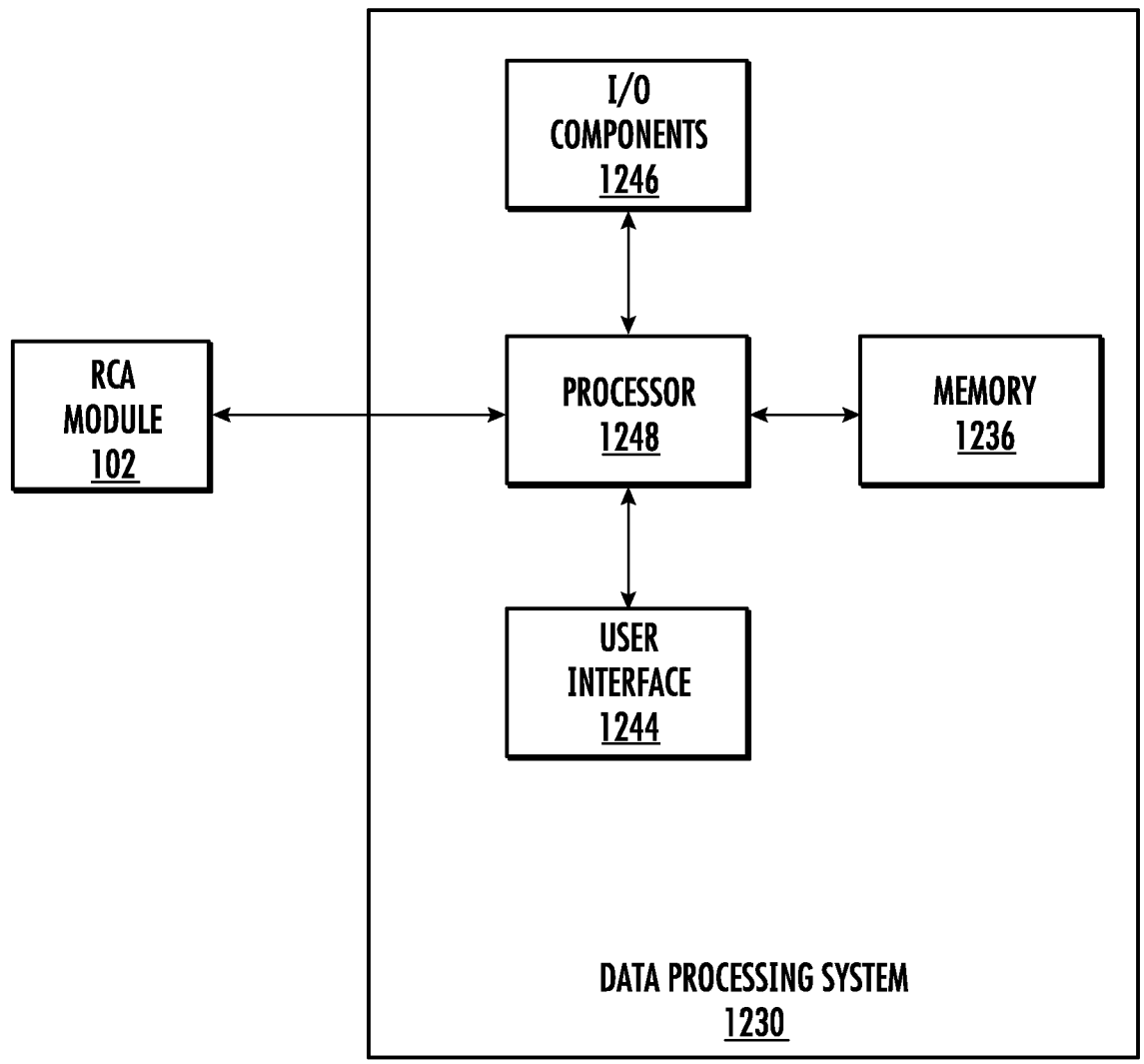
FIG. 12 is a block diagram of a data processing system for use in accordance with some embodiments of the present inventive concept.

Referring now to FIG. 12, an example of a data processing system 1230 suitable for use with any of the examples described above. Although the example data processing system 1230 is shown as in communication with the RCA module 102 in accordance with embodiments of the present inventive concept, the data processing system 1230 may also be part of the RCA module 102 or in any other component of the system 101 without departing from the scope of the present inventive concept. In some examples, the data processing system 1230 can be any suitable computing device for performing operations according to the embodiments discussed herein.

As illustrated, the data processing system 1230 includes a processor 1248 communicatively coupled to I/O components 1246, a user interface 1244 and a memory 1236. The processor 1248 can include one or more commercially available processors, embedded processors, secure processors, microprocessors, dual microprocessors, multi-core processors, other multi-processor architectures, another suitable processing device, or any combination of these. The memory 1236, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 1230.

I/O components 1246 may be used to facilitate wired or wireless connections to devices such as one or more displays, game controllers, keyboards, mice, joysticks, cameras, buttons, speakers, microphones and/or other hardware used to input or output data. Memory 1036 represents nonvolatile storages such as magnetic, optical, or other storage media included in the data processing system and/or coupled to processor 1248.

The user interface 1244 may include, for example, a keyboard, keypad, touchpad, voice activation circuit, display or the like and the processor 1048 may execute program code or instructions stored in memory 1236.

It should be appreciated that data processing system 1230 may also include additional processors, additional storage, and a computer-readable medium (not shown). The processor(s) 1248 may execute additional computer-executable program instructions stored in memory 1236. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above with respect to FIGS. 1 through 12, some embodiments of the present inventive concept provide methods for determining a root cause of a detected anomalous event in a telecommunications system. In further embodiments, an analysis of whether the detected event is a "true positive" may be performed before the root cause analysis is completed.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for determining a cause of a detected anomalous event in a telecommunications system, the method comprising:
    detecting an anomalous event in the telecommunications system;
    retrieving relevant call detail record (CDR) data associated with the detected anomalous event for at least one identified time interval responsive to detecting the anomalous event, wherein the relevant CDR data includes both current CDR data for the at least one identified time interval and historical CDR data for past intervals corresponding to the at least one identified time interval;
    preprocessing the relevant CDR data including the current CDR data and the historical CDR data;
    processing the preprocessed relevant CDR data to determine a root cause of the detected anomalous event, wherein processing the preprocessed relevant CDR data comprises comparing the current CDR data and the historical CDR data to determine the root cause of the detected anomalous event;
    confirming that the detected anomalous event is a true positive event by:
        calculating relevant summary statistics corresponding to a metric used to detect the anomalous event, the relevant summary statistics being calculated from the current and historical and current CDR data;
        performing a statistical hypothesis test on the calculated relevant summary statistics selected using the metric; and
        determining if all conditions of the statistical hypothesis test performed on the calculated relevant summary statistics are met based on results of the statistical hypothesis test; and
    generating a report including results of comparison and the determined root cause of the detected anomalous event.

2. The method of claim 1, wherein the metric is one of answer-seizure rate (ASR) volume of attempted calls (CVA); volume of failed calls (CVF);
    and volume of successful calls (CVS).

3. The method of claim 1, wherein determining comprises:
    determining that the anomalous event is a true positive if a determined probability, p-value, is found to be below a predetermined significance level; and
    determining that the anomalous event is false positive if the p-value is found to be above the predetermined significance level.

4. The method of claim 1, wherein preprocessing the relevant CDR data including the current CDR data and the historical CDR data comprises:
    checking CDR fields present in both the current CDR data and the historical CDR data to determine if the CDR fields match expected fields;
    forcing the CDR fields to be a correct data type, wherein a data type is one of string, integer, float and datetime; and
    determining if calling number fields and called number fields in the relevant CDR data contain an entire appropriate country calling code.

5. The method of claim 4, further comprising removing country calling codes from the relevant CDR data if it is determined that all CDRs are from a single country.

6. The method of claim 1, wherein processing the preprocessed relevant CDR data comprises:
    computing values for at least one selected CDR field of the preprocessed relevant CDR data including the current CDR data and the historical CDR data for the at least one identified time interval;
    determining if any of the values for the at least one selected CDR fields are statistically significant root causes;
    filtering the preprocessed relevant CDR datasets including the current and historical CDR data codes found to be statistically significant to provide filtered results; and
    processing the filtered results to locate CDRs fields determined to be significant.

7. The method of claim 6, wherein processing the preprocesses relevant CDR data further comprises:
    concluding that no standard residual are significant if any standard residual associated with the at least one selected CDR field is less than a positive z-statistic threshold; and
    labeling data as a significant root cause if any standard residual associated with the at least one selected CDR field are greater than a positive z-statistic threshold.

8. The method of claim 6, wherein the CDR data is associated with one of session initiated protocol (SIP) telephony calls and hypertext transfer protocol (HTTP) telephony calls.

9. A system for determining a cause of a detected anomalous event in a telecommunications system, the system comprising:
    a processor; and
    a non-transitory computer readable medium to store a set of instructions for execution by the processor, the set of instructions to cause the processor to:
        detect an anomalous event in the telecommunications system;

retrieve relevant call detail record (CDR) data associated with the detected anomalous event for at least one identified time interval responsive to detection of the anomalous event, wherein the relevant CDR data includes both current CDR data for the at least one identified time interval and historical CDR data for past intervals corresponding to the at least one identified time interval;

preprocess the relevant CDR data including the current CDR data and the historical CDR data;

process the preprocessed relevant CDR data to determine a root cause of the detected anomalous event by comparing the current CDR data and the historical CDR data to determine the root cause of the detected anomalous event;

confirm that the detected anomalous event is a true positive event by configuring the set of instructions to cause the processor to: calculate relevant summary statistics corresponding to a metric used to detect the anomalous event, the relevant summary statistics being calculated from the current and historical and current CDR data; perform a statistical hypothesis test on the calculated relevant summary statistics selected using the metric; and determine if all conditions of the statistical hypothesis test performed on the calculated relevant summary statistics are met based on results of the statistical hypothesis test; and generate a report including results of comparison and the determined root cause of the detected anomalous event.

10. The system of claim 9, wherein the metric is one of answer-seizure rate (ASR) volume of attempted calls (CVA); volume of failed calls (CVF); and volume of successful calls (CVS).

11. The system of claim 9, wherein the set of instructions further cause the processor to:

determine that the anomalous event is a true positive if a determined probability, p-value, is found to be below a predetermined significance level; and determine that the anomalous event is false positive if the p-value is found to be above the predetermined significance level.

12. The system of claim 9, wherein the set of instructions further cause the processor to preprocess the relevant CDR data including the current CDR data and the historical CDR data by:

checking CDR fields present in both the current CDR data and the historical CDR data to determine if the CDR fields match expected fields;

forcing the CDR fields to be a correct data type, wherein a data type is one of string, integer, float and datetime; and determining if calling number fields and called number fields in the relevant CDR data contain an entire appropriate country calling code.

13. The system of claim 12, wherein the set of instructions further cause the processor to remove country calling codes from the relevant CDR data if it is determined that all CDRs are from a single country.

14. The system of claim 9, wherein the set of instructions that cause the processor to process the relevant CDR data comprises a set of instructions to cause the processor to further:

compute values for at least one selected CDR field of the preprocessed relevant CDR data including the current CDR data and the historical CDR data for the at least one identified time interval;

determine if any of the values for the at least one selected CDR fields are statistically significant root causes;

filter the preprocessed relevant CDR datasets including the current and historical CDR data codes found to be statistically significant to provide filtered results; and process the filtered results to locate CDRs fields determined to be significant.

15. The system of claim 14, wherein the set of instructions to cause the processor to process further comprises a set of instructions to cause the processor to further:

conclude that no standard residual are significant if any standard residual associated with the at least one selected CDR field is less than a positive z-statistic threshold; and label data as a significant root cause if any standard residual associated with the at least one selected CDR field are greater than a positive z-statistic threshold.

16. The system of claim 14, wherein the CDR data is associated with one of SR telephony calls and HTTP telephony calls.

17. A computer for determining a cause of a detected anomalous event in a telecommunications system, the computer comprising:

one or more memories;

one or more processors, communicatively coupled to the one or more memories, the one or more processors configured to:

detect an anomalous event in the telecommunications system;

retrieve relevant call detail record (CDR) data associated with the detected anomalous event for at least one identified time interval responsive to detection of the anomalous event, wherein the relevant CDR data includes both current CDR data for the at least one identified time interval and historical CDR data for past intervals corresponding to the at least one identified time interval;

preprocess the relevant CDR data including the current CDR data and the historical CDR data;

process the preprocessed relevant CDR data to determine a root cause of the detected anomalous event by comparing the current CDR data and the historical CDR data to determine the root cause of the detected anomalous event;

confirm that the detected anomalous event is a true positive event by configuring the one or more processors to: calculate relevant summary statistics corresponding to a metric used to detect the anomalous event, the relevant summary statistics being calculated from the current and historical and current CDR data; perform a statistical hypothesis test on the calculated relevant summary statistics selected using the metric; and determine if all conditions of the statistical hypothesis test performed on the calculated relevant summary statistics are met based on results of the statistical hypothesis test; and generate a report including results of comparison and the determined root cause of the detected anomalous event.

18. The computer of claim 17, wherein the metric is one of answer-seizure rate (ASR) volume of attempted calls (CVA); volume of failed calls (CVF); and volume of successful calls (CVS).

19. The computer of claim 17, wherein the one or more processors are further configured to:

determine that the anomalous event is a true positive if a determined probability, p-value, is found to be below a predetermined significance level; and determine that the anomalous event is false positive if the p-value is found to be above the predetermined significance level.

20. The computer of claim 17, wherein the one or more processors are further configured to preprocess the relevant CDR data including the current CDR data and the historical CDR data by:

checking CDR fields present in both the current CDR data and the historical CDR data to determine if the CDR fields match expected fields;

forcing the CDR fields to be a correct data type, wherein a data type is one of string, integer, float and datetime; and determining if calling number fields and called number fields in the relevant CDR data contain an entire appropriate country calling code.

21. The computer of claim 20, wherein the one or more processors are further configured to remove country calling codes from the relevant CDR data if it is determined that all CDRs are from a single country.

22. The computer of claim 17, wherein the one or more processors configured to process the relevant CDR data comprises one or more processors configured to:

compute values for at least one selected CDR field of the preprocessed relevant CDR data including the current CDR data and the historical CDR data for the at least one identified time interval;

determine if any of the values for the at least one selected CDR fields are statistically significant root causes;

filter the preprocessed relevant CDR datasets including the current and historical CDR data codes found to be statistically significant to provide filtered results; and process the filtered results to locate CDRs fields determined to be significant.

23. The computer of claim 22, wherein the one or more processors are further configured to:

conclude that no standard residual are significant if any standard residual associated with the at least one selected CDR field is less than a positive z-statistic threshold; and label data as a significant root cause if any standard residual associated with the at least one selected CDR field are greater than a positive z-statistic threshold.

24. The computer of claim 22, wherein the CDR data is associated with one of session initiated protocol (SIP) telephony calls and hypertext transfer protocol (HTTP) telephony calls.

* * * * *